May 22, 1928.    1,670,297
E. J. BILLSTROM
CLAMP
Filed July 6, 1926
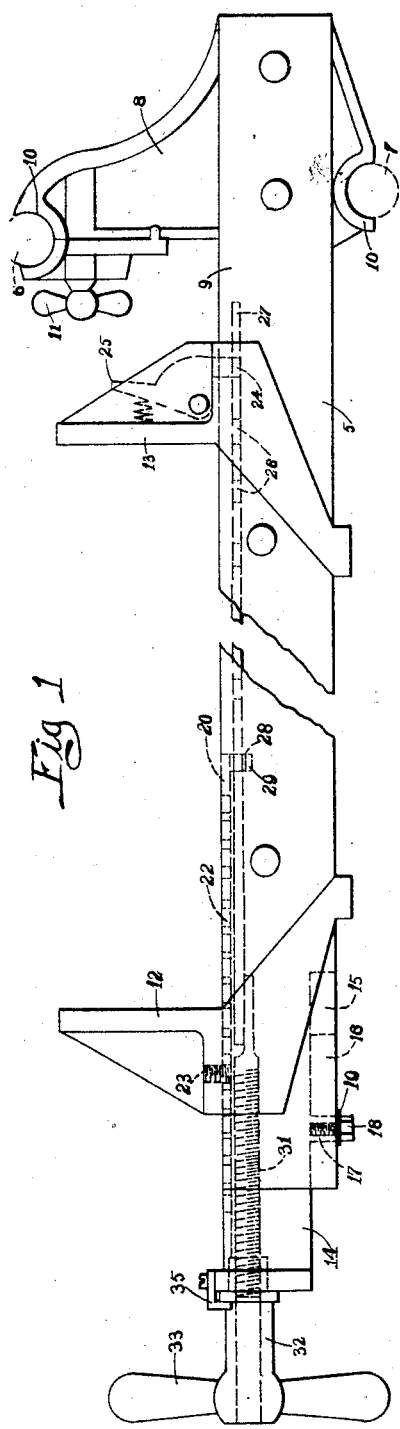
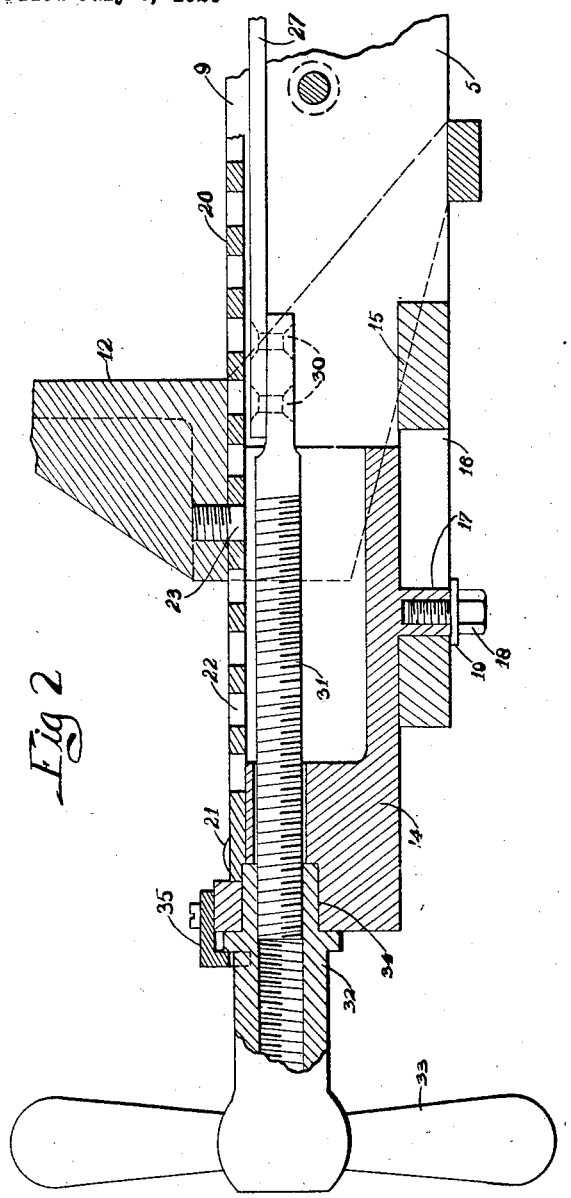
Inventor
Edwin J. Billstrom
By Wilson & McConna
Attys Patented May 22, 1928.

1,670,297

UNITED STATES PATENT OFFICE.

EDWIN J. BILLSTROM, OF ROCKFORD, ILLINOIS.

CLAMP.

Application filed July 6, 1926. Serial No. 120,629.

This invention relates to clamps such as are adapted for use on glue clamp carriers extensively used in woodworking for the holding of work after the gluing thereof.

The principal object is to provide a clamp for a machine of the character referred to which provides for the sliding adjustment of the jaws together or separately in relation to the machine to suit the requirements of any particular job being handled and for the screw-threading adjustment of the one jaw relative to the other to clamp the work after the jaws have been positioned.

Another object is to provide a clamp having double-acting jaws, as just referred to, wherein the outer jaw is capable of being set to any position of fixed adjustment in relation to the adjustable, movable inner jaw to confine work of any particular breadth between the jaws, the two jaws being adjustable together, as stated before, to properly position the same and the inner jaw being adjustable toward the outer jaw to clamp the work. The adjusting of the outer jaw, which is fixed or stationary once it is set, may be made in steps determined by the spacing of openings in a rod relative to which the jaw is arranged to be set. Any position intermediate a setting of the jaw at either of two succeeding openings in the rod is arranged to be secured by the sliding adjustment bodily of the two jaws with the rod and relative to a supporting bar thereby permitting the precise setting of the jaws to accommodate the work.

The invention is illustrated in the accompanying drawing wherein—

Fig. 1 is a side view, partly broken away, of a bar clamp embodying the present improvements; and Fig. 2 is an enlarged longitudinal vertical section through the outer end thereof to convey a clear understanding of the adjustable head or stock member and parts connected therewith.

The clamp of the present invention comprises a bar 5 arranged for support in the usual manner on rods 6 and 7 of a glue clamp carrier. The supporting bracket 8 fixed between the side members 9 of the bar 5 is arranged to be slidable along the rods on bearings 10 in a manner well known in the art, there being an adjustable wing nut 11 for keeping the clamp with its bracket assembled on the machine. The mounting described permits adjustment of the clamp bodily from side to side relative to the machine. According to the present invention a pair of clamping jaws 12 and 13, generally of a conventional form are arranged for adjustment bodily in and out relative to the carrier on the bar 5 to accommodate any particular job that may be encountered. That is, occasionally the stock to be clamped varies in width at different places along the length thereof. The matter of clamping such work with the ordinary type of clamp became a quite involved one and certain jobs could not be handled. By virtue of the present invention, however, the outer jaw 12 may be moved inwardly and set in any desired position of fixed adjustment next to the work and the inner jaw 13 can also be adjusted outwardly to the other side of the work to position the jaws for clamping. Any slight variation desired in the positioning of the fixed jaw 12 is thereupon secured by adjusting the two jaws bodily in a manner hereinafter set forth. The first and principal adjustment is a coarse one while the last adjustment is a relatively fine one. This will appear more clearly hereinafter.

The jaws 12 and 13 are movable with or in relation to a head or stock member 14 which is mounted for limited adjustment lengthwise relative to the bar 5. As shown in Fig. 2 the side members 9 of the bar 5 are joined at the outer ends thereof by a web 15. The latter is provided with a slot 16 extending lengthwise relative to the bar 5. A flat-sided lug 17 depending from the head 14 is received in the slot 16 to guide and limit the movement of the head. The cap screw 18 and washer 19 keep the head assembled on the bar but permit fairly free sliding of the head relative to the bar. A rod 20 is fixed to the head 14 as by means of rivets 21 or the like and extends lengthwise of the bar 5 centrally between the side members 9. A plurality of regularly spaced openings 22 are provided in the rod 20 for determining the setting of the fixed jaw 12 at different positions lengthwise relative to the bar. A stud 23 threading into the jaw 12 is arranged for selective engagement in any one of the openings 22. Assuming for example, that the jaw 12 has been advanced to one side of the work but by reason of the spacing of the openings 22 it is otherwise impossible to position the jaw in engagement with the work the head 14 may be moved one way or another to secure the desired setting of the jaw. That is, the spacing of the openings 22 permits a coarse adjustment of the jaw by predetermined steps, whereas the adjustment of the head with the jaw permits a fine adjustment.

The jaw 13 may be set in a similar manner to the jaw 12 by the engagement of a tooth 24 on the spring-pressed latch 25 selectively into any one of the series of regularly spaced slots or openings 26 in a rod 27 extending lengthwise of the bar 5 centrally between the side members 9. The rod 27 is preferably guided for movement in an opening 28 provided in a lug 29 projecting from beneath the rod 20 and is fixed as by means of rivets 30 to the inner end of a screw 31. The latter is arranged to be given translational movement endwise by the turning of a nut 32 with a handle 33. The nut 32 is engaged in a socket 34 provided in the outer end of the head 14 and is held against movement outwardly relative to the head by means of a yoke 35 when, for example, the jaw 13 is being moved inwardly away from the jaw 12.

It will be clear from the foregoing description that I have provided a clamp of an extremely simple and thoroughly practical construction affording a wide range of adjustability for the jaws to accommodate practically any job that may be encountered. The provision of clamps of this character on a glue clamp carrier will obviously greatly increase the range of work that may be handled thereby.

It is believed that the foregoing description conveys a clear understanding of the invention and of its purposes and advantages so that anyone skilled in the art to which the invention relates will appreciate the possible applications thereof.

I claim:

1. In a device of the character described, the combination with a support, such as a part of a glue clamp carrier, of a clamp bar mounted on said support, a jaw carrier adjustably mounted on said bar for movement toward and away from said support, a pair of jaws on said carrier, one of said jaws being movable to different positions relative to the other jaw to get the work positioned between the jaws and the one jaw being adjustable toward and away from the other jaw to permit clamping the work therebetween, and screw means for operating said jaw.

2. In a device of the character described, the combination with a support, such as a part of a glue clamp carrier, of a clamp bar mounted on said support, a jaw carrier adjustably mounted on said bar for movement toward and away from said support, a pair of jaws on said carrier, both of said jaws being movable to different positions on the carrier to get the work positioned therebetween, and the one jaw being adjustable toward and away from the other jaw to permit clamping the work therebetween, and screw means for operating said jaw.

3. In a device of the character described, the combination with a support, such as a part of a glue clamp carrier, of a clamp bar mounted on said support and extending outwardly therefrom, said bar comprising a stock member adjustable lengthwise with respect to said bar in and out with respect to said supporting carrier, and clamping jaws movable with said stock member and adjustable relative to each other thereon.

4. In a device as set forth in claim 3, the provision of a mounting for said bar on said support permitting the adjustment sidewise of said bar with respect to said support to correspondingly position said jaws whereby said jaws may be positioned at any point in and out and laterally relative to said support.

5. In a clamp, the combination with a bar, of a pair of jaws therefor to oppositely engage work therebetween, and means for operating said jaws toward and away from each other, said means being adjustable lengthwise relative to said bar to move the two jaws simultaneously and in one direction and through the same distance to different positions of adjustment lengthwise relative to said bar.

6. In a clamp, the combination with a bar, of jaws on said bar for clamping work therebetween and a stock member adjustably mounted on said bar and providing means for the adjustment of said jaws relative to each other whereby to move both of said jaws a like amount and in the same direction upon the adjustment of said stock member.

7. In a clamp, the combination of a bar, an inner and an outer jaw thereon for clamping work therebetween, a means having said jaws mounted thereon arranged for adjustment lengthwise relative to said bar, one of said jaws being arranged for fixed position with respect to said mounting, and means on said mounting for adjusting the other jaw toward and away from the last mentioned jaw.

8. In a clamp, the combination of a bar, a head movably mounted on said bar for adjustment relative thereto, a fixed jaw carried by said head to move therewith, and an adjustable jaw movable toward and away from the fixed jaw and movable with the head in its adjustment, and means for operating said last mentioned jaw.

9. In a clamp, the combination of a bar, a head mounted thereon for adjustment lengthwise relative thereto, a fixed jaw carried by said head to move therewith, means on said head permitting the setting of said fixed jaw to different positions spaced lengthwise relatively to said bar, an adjustable jaw, the latter being movable with the head in its adjustment, and an operating connection between said adjustable jaw and said head for moving said jaw relative to the fixed jaw.

10. In a clamp, the combination of a bar, a head mounted thereon, a rod fixed on said head and extending lengthwise relative to said bar and provided with a plurality of spaced openings therein, a clamping jaw having a part to be selectively engaged in any one of said openings whereby to fixedly position said jaw relative to said head, a second rod extending lengthwise relative to said bar having a plurality of spaced openings therein, a second clamping jaw having a part for selective engagement in any one of said openings, and means for adjusting said second rod lengthwise relative to said bar in relation to said head.

11. In a clamp, the combination of a bar, a head adjustably mounted thereon and guided for limited movement lengthwise relative thereto, a rod fixed relative to said head to move therewith and having a plurality of openings therein spaced lengthwise relative to said bar, a clamping jaw having a part arranged to be selectively engaged in any one of said openings to fixedly position the jaw relative to said head, a second rod provided with a plurality of openings therein spaced lengthwise relative to said bar, means on said head for adjusting said rod toward and away therefrom, means on the first rod for guiding the second rod, and a second clamping jaw having a part for selective engagement in any one of said last-mentioned openings to determine its initial position before adjustment of said second rod relative to said head.

In witness of the foregoing I affix my signature.

EDWIN J. BILLSTROM.